(12) United States Patent
Rogier

(10) Patent No.: US 9,283,980 B2
(45) Date of Patent: Mar. 15, 2016

(54) METHODS AND DEVICES FOR TRANSPORTING ARTICLES

(71) Applicant: Karen Elaine Rogier, Orlando, FL (US)

(72) Inventor: Karen Elaine Rogier, Orlando, FL (US)

( * ) Notice: Subject to any disclaimer, the term of this patent is extended or adjusted under 35 U.S.C. 154(b) by 0 days.

(21) Appl. No.: 14/288,812

(22) Filed: May 28, 2014

(65) Prior Publication Data

US 2015/0061245 A1  Mar. 5, 2015

Related U.S. Application Data

(60) Provisional application No. 61/959,844, filed on Sep. 2, 2013.

(51) Int. Cl.
*A61G 1/00* (2006.01)
*B62B 15/00* (2006.01)

(52) U.S. Cl.
CPC ...................................... *B62B 15/00* (2013.01)

(58) Field of Classification Search
CPC .......... A61G 1/01; A61G 1/007; B62B 15/00; B62B 5/02
USPC ........................................................... 280/19
See application file for complete search history.

(56) References Cited

U.S. PATENT DOCUMENTS

| | | | |
|---|---|---|---|
| 1,022,308 A | 4/1912 | Elkins | |
| 2,308,699 A | 1/1943 | Longenecker | |
| 2,424,694 A | 7/1947 | Jones | |
| 3,938,818 A | 2/1976 | Studeny et al. | |
| 4,132,427 A | 1/1979 | McGee | |
| 4,173,351 A | 11/1979 | Hetland | |
| 4,504,071 A | 3/1985 | Drummond | |
| 4,570,954 A | 2/1986 | Mintz | |
| 4,639,003 A | 1/1987 | Potter | |
| 5,104,133 A * | 4/1992 | Reiner | 280/19 |
| 5,150,487 A | 9/1992 | Hemphill | |
| 5,253,885 A | 10/1993 | McCracken et al. | |
| 5,836,593 A | 11/1998 | Skinner | |
| D416,518 S | 11/1999 | Hoke | |
| 6,746,028 B2 * | 6/2004 | Barbee | 280/20 |

(Continued)

FOREIGN PATENT DOCUMENTS

| | | |
|---|---|---|
| CA | D29806 | 9/1967 |
| CA | 2617431 | 6/2009 |
| CA | D140922 | 3/2013 |

OTHER PUBLICATIONS

Bigslider product information, [online, webpage, retrieved Mar. 13, 2014] from: http//www.thehomeknowitall.com/the_home_knowitall/2009/02/moving-big-furniture.html, pp. 1-2.

(Continued)

*Primary Examiner* — John Walters
*Assistant Examiner* — Brian Swenson
(74) *Attorney, Agent, or Firm* — Saliwanchik, Lloyd & Eisenschenk

(57) ABSTRACT

A slideable transport device that can be used to move articles across or over horizontal and, in particular, inclined or angled structure or surfaces. More specifically, the subject invention provides one or more embodiments of a cushioned slider, or similar device, capable of moving articles up and down an incline, such as stairs or a hill, and also across more horizontal surfaces, such as floors or ground. Embodiments of the invention include a method by which articles can be transported by dragging up or down stairs or other inclined ground.

34 Claims, 7 Drawing Sheets

(56) References Cited

U.S. PATENT DOCUMENTS

| | | | |
|---|---|---|---|
| 6,845,533 B1 | 1/2005 | Tulette | |
| D573,062 S | 7/2008 | Litchfield | |
| 7,699,324 B2 * | 4/2010 | Walkingshaw et al. | 280/18.1 |
| 7,789,761 B1 * | 9/2010 | Lumsden | 472/116 |
| 7,810,820 B2 | 10/2010 | Wolf et al. | |
| 8,091,937 B2 | 1/2012 | Mastromatto et al. | |
| 8,615,829 B2 * | 12/2013 | Kenalty et al. | 5/628 |
| 8,635,742 B2 | 1/2014 | Smith et al. | |
| 8,771,093 B2 * | 7/2014 | Bowen | 472/116 |
| 2009/0160144 A1 * | 6/2009 | Kleinsasser | 280/19 |
| 2011/0241300 A1 | 10/2011 | Schioler et al. | |
| 2012/0151679 A1 * | 6/2012 | Kenalty et al. | 5/628 |
| 2013/0227791 A1 * | 9/2013 | Kostron et al. | 5/629 |

OTHER PUBLICATIONS

Furniture Moving Sliders product information, [online, webpage, retrieved Mar. 13, 2014] from: http://www.kofflersales.com/p/furniture-glides.asp, pp. 1-2.

Wetnoz Bowl Mat product information, [online, webpage, retrieved Mar. 13, 2014] from: http:www.prestigepetproducts.com.au/49__dash__WN23577/WETNOZ-BOWL-MAT-__dash__-NIGHT/pd.php?scat1=0, pp. 1-2.

* cited by examiner

METHODS AND DEVICES FOR TRANSPORTING ARTICLES

CROSS-REFERENCE TO RELATED APPLICATION(S)

The present application claims the benefit of U.S. Provisional Patent Application Ser. No. 61/959,844, filed Sep. 2, 2013, which is hereby incorporated by reference herein in its entirety, including any figures, tables, or drawings.

BACKGROUND OF INVENTION

The use of tarpaulins or "tarps" to transport objects across the ground or over structure is a common practice. Typically, articles are placed on the tarp and one edge of the tarp is pulled to drag the articles across the ground or structure. The sides or edges of the tarp can be folded or turned upwards to help prevent articles from sliding off of the tarp, particularly over uneven ground or surfaces. Tarps are also usually made of a thin, flexible material that has a smooth surface. The smooth surface facilitates dragging articles thereon across the ground. As long as the tarp is used on relatively horizontal surfaces, articles can be dragged and will usually remain on the tarp.

There is a need for a transporting device having flexible portions which can be used on both horizontal surfaces, such as the ground or a floor, and inclined surfaces, such as stairs or hills.

BRIEF SUMMARY

Embodiments relate to methods and devices for transporting an article up and/or down stairs. Embodiments can utilize a flexible device to transport an article up and/or down an inclined surface, such as stairs. Specific embodiments relate to a device having a smooth or other type of low-friction outer surface that can contact a structure, such as the edge and/or other surfaces of stairs. The device can be particularly advantageous when ascending or descending the stairs during transport. More specifically, embodiments of the subject invention address the problem of being able to transport articles up and/or down an inclined surface, such as, for example, stairs and across a horizontal surface with the same device by the use of a flexible cushioned slider having a smooth or low-friction bottom outer surface. The bottom outer surface at the bottom side of the device can be conducive to dragging articles on the slider over horizontal surfaces, and the cushioned body allows the bottom outer surface to be usable as well on inclined surfaces. In a particular embodiment, for use on stairs, the cushioning of the slider allows for the formation of indentations within the bottom outer surface at the bottom contact region 79 of the slider, due to articles placed thereon pushing the cushioned body against the stair edges and surfaces. The indentation created by a stair edge in the bottom surface of the slider can travel along the bottom contact region 79 as the slider is dragged or move over the stair edge. The increased friction of the edge indenting into the bottom surface of the slider can provide greater control over the speed of descent of the device and/or can reduce the risk of the slider sliding backwards during ascent of the stairs. Certain embodiments can have apparatuses for securing articles thereon. The slider embodiments of the subject invention can be easy to store and can also be capable of transporting articles of various size and shape by easily dragging it over a surface.

The embodiments of the subject invention successfully address the above described disadvantages associated with the previously known devices and methods and provide certain attributes and advantages, which have not been realized by these known devices. In particular, the subject invention provides novel, inexpensive, and highly effective devices and methods for convenient and effective transport of articles up or down an inclined surface, such as stairs or a hill, as well as over horizontal surfaces without changing the operation of the device.

Certain embodiments of the subject invention, referred to herein, in general, as a "slider," can include a flexible cushioned body, that resists or is inhibited from stretching or elongating, and having some type of handle device or holding mechanism. One side of a slider can have a low friction contact surface for contacting the horizontal or inclined structure. Various straps and connectors can be used to secure articles on the slider to prevent them from falling or sliding off, particularly when used on an inclined surface. Additional embodiments can include apparatuses or features that help hold objects on the slider or at least inhibit them from falling off the slider when being dragged up or down an incline.

It should be noted that this Brief Summary is provided to generally introduce the reader to one or more select concepts described below in the Detailed Disclosure in a simplified form. This Summary is not intended to identify key and/or required features of the claimed subject matter. Other aspects and further scope of applicability of the present invention will also become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions. The invention is defined by the claims below.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which.

DETAILED DISCLOSURE

Figure 1:
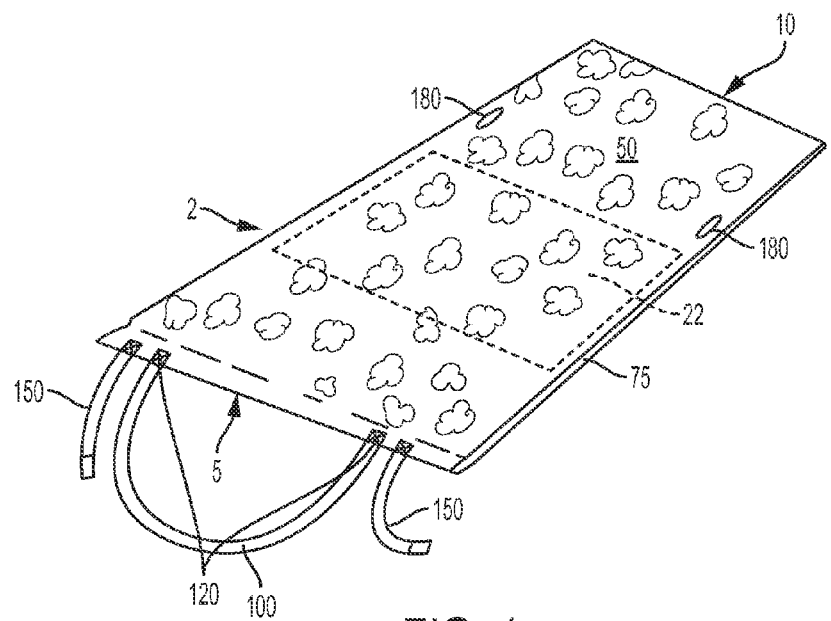
FIG. 1 is a front perspective illustration of one embodiment of a slider according to the subject invention.

The subject invention describes embodiments of a transport device that can be used to move articles across or over horizontal and/or, most advantageously, inclined or angled surfaces. More specifically, the subject invention provides one or more embodiments of a flexible slider, or similar device, capable being used to move articles up and down an incline, such as stairs or a hill, and also across more horizontal surfaces, such as floors or ground. Embodiments of the invention include a method by which articles can be transported by placing them on the slider and dragging them, either a generally horizontal surface or over (up and down) an inclined surface.

The following description will disclose that embodiments of the subject invention are particularly useful for moving articles up and down stairs. However, a person with skill in the art will be able to recognize numerous other uses that would be applicable to the devices and methods of the subject invention, including use on generally horizontal surfaces. Thus, while the subject application describes, and many of the terms herein relate to, a use for transporting articles up or down stairs, other modifications apparent to a person with skill in the art and having benefit of the subject disclosure are contemplated to be within the scope of the present invention.

As used herein, and unless otherwise specifically stated, the terms "operable communication," "operable connection," "operably connected," "operatively attached," "cooperatively engaged" and grammatical variations thereof mean that the particular elements are connected in such a way that they cooperate to achieve their intended function or functions. The "connection" or "engagement" may be direct, or indirect, physical or remote.

The term "structure" as used herein is merely for literary convenience. The term should not be construed as limiting, in any way, where the methods and devices of the subject invention can be used. The embodiments of the subject invention can be used on any structure oriented between 0° and 90° Thus, it should be understood that the devices, apparatuses, methods, techniques, and/or procedures of the subject invention could be utilized on any indoor or outdoor horizontal surface or incline—natural, artificial, man-made, etc.—having any texture, shape, or configuration. Thus, the embodiments of the subject invention can be used on any horizontal surface or an incline over which a slider and articles thereon can be transported by dragging. This can include, but is not limited to, substantially horizontal surfaces, like the ground, floors, or platforms. It can also include, but it not limited to, substantially inclined surfaces, like stairs, hills, or ramps.

Any reference in this specification to "one embodiment," "an embodiment," "example embodiment," "further embodiment," "alternative embodiment," etc., is for literary convenience. The implication is that any particular feature, device, or characteristic described in connection with such an embodiment is included in at least one embodiment of the invention. The appearance of such phrases in various places in the specification does not necessarily refer to the same embodiment. Further, when a particular feature, device, or characteristic is described in connection with any embodiment, it is within the purview of one skilled in the art to affect such feature, device, or characteristic in connection with other ones of the embodiments.

Finally, reference is made throughout the application to the "proximal end" and "distal end." As used herein, the proximal end is the end that would be closest to a person utilizing embodiments of the subject invention. Conversely, the distal end of the device is that end which, when fully extended or flat, would be furthest from a person utilizing embodiments of the subject invention. It will become apparent in the following description that the distal end can be brought closer to a person using the disclosed embodiments. But, for the purposes of this description, "distal" refers to that end as described here.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

Reference will be made to the attached figures on which the same reference numerals are used throughout to indicate the same or similar components. With reference to FIGS. 1-5, and others attached hereto, which show certain embodiments of the subject invention, it can be seen that embodiments of the subject invention can include a "slider" 2 having a cushioned body 50 that can also be flexible, with a bottom outer surface 75 and one or more handle devices 100. Embodiments can also include one or more ties 155 and/or securing mechanisms 160 attached to the cushioned body, which can be used to secure articles 3 to the slider. Ties and securing mechanism can be placed anywhere on the cushioned body, including, but not limited to, the ends or sides of the cushioned body. For reference purposes, the proximal end 5 will refer to that end being closest to a user dragging the slider and the distal end 10 will refer to that end furthest from a user when the slider is being dragged.

The cushioned body of a slider can provide advantages to the embodiments of the subject invention. One advantage is that it can buffer articles 3 placed on the cushioned body against the structure over which they are dragged. A cushioned body can comprise a material that is resilient, so that it can indent under pressure (force or weight per unit) and then return to an original shape when the pressure is removed. Another advantage is that it can provide resistance between the bottom outer surface 75 and the structure. In one embodiment, an article placed on top of the cushioned body will cause the cushioned body to push against the bottom outer surface 75. In so doing, it increases the area of contact between the structure and the bottom outer surface 75, due to the cushioned body pushing against the flexible bottom outer surface 75 causing it to conform to the shape of the structure. Thus, when the cushioned body conforms, it can causes indentations 77 to be formed in the bottom outer surface and the cushioned body. Such indentations can increase the frictional force between the structure and the bottom outer surface by increasing the area of contact between the structure and the bottom outer surface and/or cause a portion of the bottom outer surface to be at an angle to the direction of travel.

This conforming effect or creation of indentations 77 can be particularly advantageous when the slider 2 is used on stairs. The weight of articles 3 on the cushioned body can cause the cushioned body and the bottom outer surface to conform to the shape of the stair edges 25 forming temporary indentations 77 in the bottom outer surface, as shown, for example, in FIGS. 5 and 6A. These indentations 77 can increase friction between the stair edges 25 and the bottom outer surface, creating resistance when the slider is dragged or slid over stairs. Typically, articles that do not conform to the shape of the stair edges tend to slide down uncontrollably on the stair edges. Likewise, if dragged up the stairs, nonconforming articles will tend to slide backwards if released. Further, the weight of the article may not be supported on the stair edges. The indentations 77 formed in the slider embodiments of the subject invention by the structure can have the effect of slowing the speed at which the slider 2 and articles can move. The formation of the indentations in the slider by the stair edges 25 can necessitate a force being used to move the slider, which can inhibit uncontrolled or an undesirable speed of descent. The more the cushioned body and bottom outer surface conform to the shape of the stair edges, the greater the resistance. Thus, heavier articles placed on the slider can create more pronounced indentation, providing greater potential resistance to dragging, and lend greater control to a user during the process of descending stairs with the slider.

Embodiments can be used to move items up and/or down sets of stairs having an angle of inclination to the horizontal of at least 10%, 15%, 20%, 25%, 30%, 35%, 40%, 45%, 50%, and/or 60%, and/or an angle in a range between any two of the listed values, and having a stair rise (height difference between adjacent steps) of at least 2, 3, 4, 4½, 5, 5½, 6, 6½, 7, 7½, and/or 8 in, and/or a stair rise in a range between any two of the listed values.

The articles 3 that can be placed on a slider can be any of a variety of shapes, sizes, dimensions or weights. Advantageously, a slider of the subject invention can allow larger, bulkier, and/or heavier items to be placed at a lower vantage point, so that it may be possible to see around or over the article as it is being dragged. However, larger articles can be moved with the embodiments of the subject invention. Typically, the dimensions of an article are such that it fits entirely within a top loading region 22 on a top side 20 of the slider. However, it is possible for articles to have dimensions larger than those of the slider, such that some part of the article hangs or extends off the sides of the slider and, thus, does not fit within a top loading region 22 of the slider. The top loading region 22 of a slider can be an area that encompasses all or at least some portion of the top side of a slider. Typically, though not required, articles are arranged at about the center and towards the distal end of the top side of the slider. However, it will be understood that articles can be placed anywhere on the top side of a slider. In one embodiment, the top loading region is an area that encompasses approximately the distal ⅔ of the top side of the slider. This can allow the proximal end of the slider to be raised, as will be described below.

Further, the weight of articles that can be used with a slider can also vary. Ideally, one or more articles placed on the top loading region of a slider are arranged so that the total weight is distributed advantageously for sliding over the desired structure. There are also several factors that can dictate the maximum weight that can be used on a slider. For example, the materials utilized for a slider can limit the maximum weight of articles used thereon. The ability of a user to drag articles of a certain weight can also factor into how heavy the articles can be.

In one embodiment, the total maximum weight of one or more articles that can be moved with a slider is between approximately 100 lbs. and 300 lbs. In a more specific embodiment, the total maximum weight of one or more articles that can be moved with a slider is between approximately 100 lbs. and 200 lbs. In a still more specific embodiment, the maximum weight of one or more articles that can be moved with a slider is between approximately 100 lbs. and 150 lbs. Further specific embodiments involve moving a total weight in the range 20-50 lbs., 25-50, 50-75 lbs., 75-100 lbs., 100-125 lbs., 125-150 lbs., 150-175 lbs., and 175-200 lbs.

It can beneficial to use one or more materials that require less bulk or volume to achieve sufficient conformation, as described above. Such materials can include, but are not limited to, polyurethane foam, polyethylene foam, microcellular plastic foams, silicone foams, rubber-based foams, natural sponge, and foams or sponges of other types of materials.

It can also be important for the material of the cushioned body to be selected so as to provide a slider that is flexible, resists stretching or shape distortion, and is also capable of sufficiently conforming to the shape of the structure, for example, stairs. More specifically, it can be important for the material of the cushioned body to be capable of forming indentations having a size or depth in relation to the weight of articles 3 placed on the slider. Because the slider can be pulled with one or more articles thereon, it can also be important for the material of the slider to resist stretching, at least in a longitudinal direction, that is, in a distal to proximal direction. In one embodiment, the body comprises a resilient, cushioning material capable of conforming to the shape of the structure, such as stair edges, and which resists stretching or elongation in at least a longitudinal direction.

By way of non-limiting example, the cushioned body can be made of a foam or sponge material having a suitable Indentation Force Deflection (IFD) rating that provides sufficient resistance. IFD is a test method by which to determine the load bearing capacity (firmness or stiffness) of a foam material, and is usually expressed in pounds force per 50 $in^2$ at a given percent deflection of the foam.

For example, high grade cushion foam of a 4-inch thickness has a target IFD of 50 lbs/50 $in^2$ at a deflection depth of 25% of the original thickness of a sample after a rest period of one minute. To obtain the IFD value, a testing device is used to drive a 50 $in^2$ circular indenter platen into a 15"×15"×4" foam sample, stopping when it reaches a deflection of 1", or 25% of the 4-inch thickness. The testing device records the force in pounds required to hold this foam indented after one minute. A higher the force reading indicates a higher load bearing capacity of the foam.

In one embodiment, the cushioned body can have an IFD of between approximately 10 lbs./50 $in^2$ and approximately 100 lbs./50 $in^2$. In other embodiments, the cushioned body, or a material that is covered to form the cushioned body, can have an IFD of at least 5, 10, 1.5, 20, 25, 30, 35, 40, 45, 50, 55, 60, 65, 70, 75, 80, 85, 90, 95, and/or 100 lbs./50 $in^2$ and/or an IFD in a range between any two of the values listed. In addition to the IFD, there are a variety of other factors that can determine the strength, resiliency and load bearing capacity of a particular foam material. Thus, while the IFD of the material of a cushioned body can be an important factor to consider, other factors may also affect the suitability of a particular material selected for a cushioned body. A person with skill in the art will be able to determine which of one or more materials, including foam or foam-like materials, would be suitable for a cushioned body, according to the subject invention. Such variations which provide the same function in substantially the same way with substantially the same result are within the scope of this invention.

Specific embodiments can have a body thickness of at least ¼, ½, ¾, 1, 1¼, 1½, 1¾, 2, 2¼, 2½, 2¾, and/or 3 in, and/or a thickness in a range between any two of the listed values.

The cushioned body could also be made from one or more non-foam materials that provide sufficient flexibility and conformation characteristics, without undesirable stretching. By way of non-limiting example a cushioned body can have one or more pads made of cotton, silicone, rubber, polyester, plastic, wool, or other types of natural fibers and man-made materials, or combinations thereof. In a further embodiment, one or more pads can be used in combination with foam or sponge material, as described above.

Cushioned surfaces are well-known in the art and are utilized for a variety of purposes. It would be within the skill of a person trained in the art to determine one or more materials that would be appropriate for the cushioned body embodiments of the subject invention. Such variations that provide the same function, in substantially the same way, with substantially the same result are within the scope of this invention.

In a further embodiment, the cushioned body can be made so as to have a bottom side 15 that can function as a bottom outer surface. In one embodiment, the material utilized for the cushioned body can be suitable for a bottom outer surface. Alternatively, the cushioned body can be made with a bottom side that is treated, formed, or made so as to function as a bottom outer surface. By way of non-limiting example, the bottom side 15 of a cushioned body could be made smooth or have an uninterrupted surface that facilitates sliding. For example, the material of a cushioned body could be heated or otherwise treated on the bottom side to provide a different texture, one that is conducive to sliding. Alternatively, the cushioned body could have a smooth or a low-friction material attached thereto. In one embodiment, the cushioned body is a foam material with a smooth plastic pad 65 attached to the bottom side 15, as illustrated in the example in FIG. 7.

Figure 2:
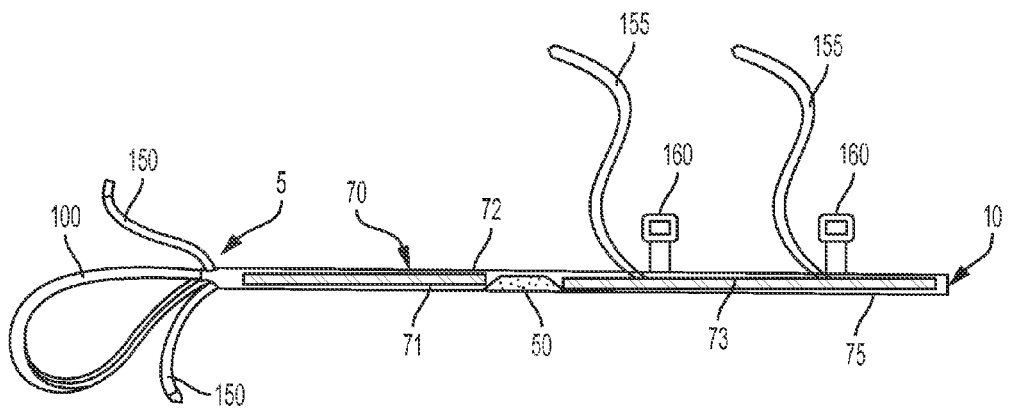
FIG. 2 is side elevation illustration of one embodiment of a slider according to the subject invention.

In an alternative embodiment, a cushioned body can have an outer shell 70, which is illustrated, by way of non-limiting example, in FIG. 2. The outer shell can have a lower sheet 71 that can function as a bottom outer surface 75 and an upper sheet 72 for placing articles on. The upper and lower sheets can be attached, directly or indirectly to each other, and/or they can be attached to the cushioned body. In one embodiment, shown by way of example in FIGS. 1, 5, and 10, one or more edges of the upper and lower sheets can be attached to form an outer shell 70. However, the upper sheet 72 and the lower sheet 71 could be attached to one or more edgings 73 that form sides to the outer shell, such as shown in the example in FIG. 2. The cushioned body can be positioned within the outer shell so that it can be removed from the outer shell. Alternatively, the cushioned body can be permanently affixed within the outer shell.

Figure 10:
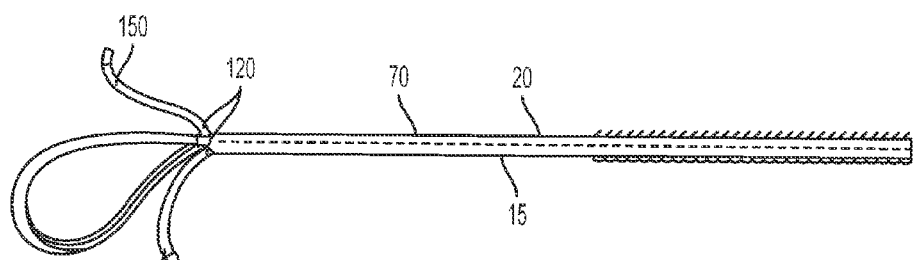
FIG. 10 is a side elevation illustration of one embodiment of a slider according to the subject invention, wherein the top side and bottom side each are made of more than one material.

The outer shell 70 can also have any one of a variety of material configurations. In one embodiment, at least the lower sheet 71 and the upper sheet 72 are made of the same material. In an alternative embodiment, at least the lower sheet and upper sheet are made of two or more different materials. As a non-limiting example, the upper sheet could be made of a canvas material, another woven material, or any material that aids in securing articles thereon and the lower sheet could be made of a durable plastic or nylon material, woven or otherwise, that is durable and permits easy sliding over structure. In another embodiment, the upper sheet can be made of two or more materials, such that the top outer surface of the top side has different surface textures. Likewise, the lower sheet could be made of two or more materials, such that there is a bottom outer surface of different surface textures that could provide different amounts of friction to different sections of the bottom outer surface or to the bottom contact region 79 of the cushioned body. FIG. 10 illustrates a non-limiting embodiment where the outer shell of a cushioned body has two different materials on the top side 20 and the bottom side 15. In this example, the material towards the distal end of the top side 20 and the bottom side 15 has a rougher texture that provides greater friction between articles and/or structure. This configuration could also be reversed, where material that provides greater frictional force is near the proximal end. Different materials used on the top and bottom sides can be advantageous when descending inclined structure, or stairs, as it can slow the rate of sliding and provide more control over the rate of descent, as well as inhibit articles from moving or sliding over the top side.

The factors that can be considered by those skilled in the art with regard to the choice of materials for a slider of the subject invention have been discussed above and are reasserted here with regard to the outer shell. In a particular embodiment, the outer shell is comprised of one or more materials that allow the formation of indentations in the bottom side and/or the cushioned body and which resists or inhibits undesirable amounts of stretching or elongation of the material. In a specific embodiment, the outer shell is comprised of a plastic or nylon material that is conducive to sliding on a structure and that resists or is inhibited from stretching when pulled with one or more articles positioned thereon.

Figure 5:
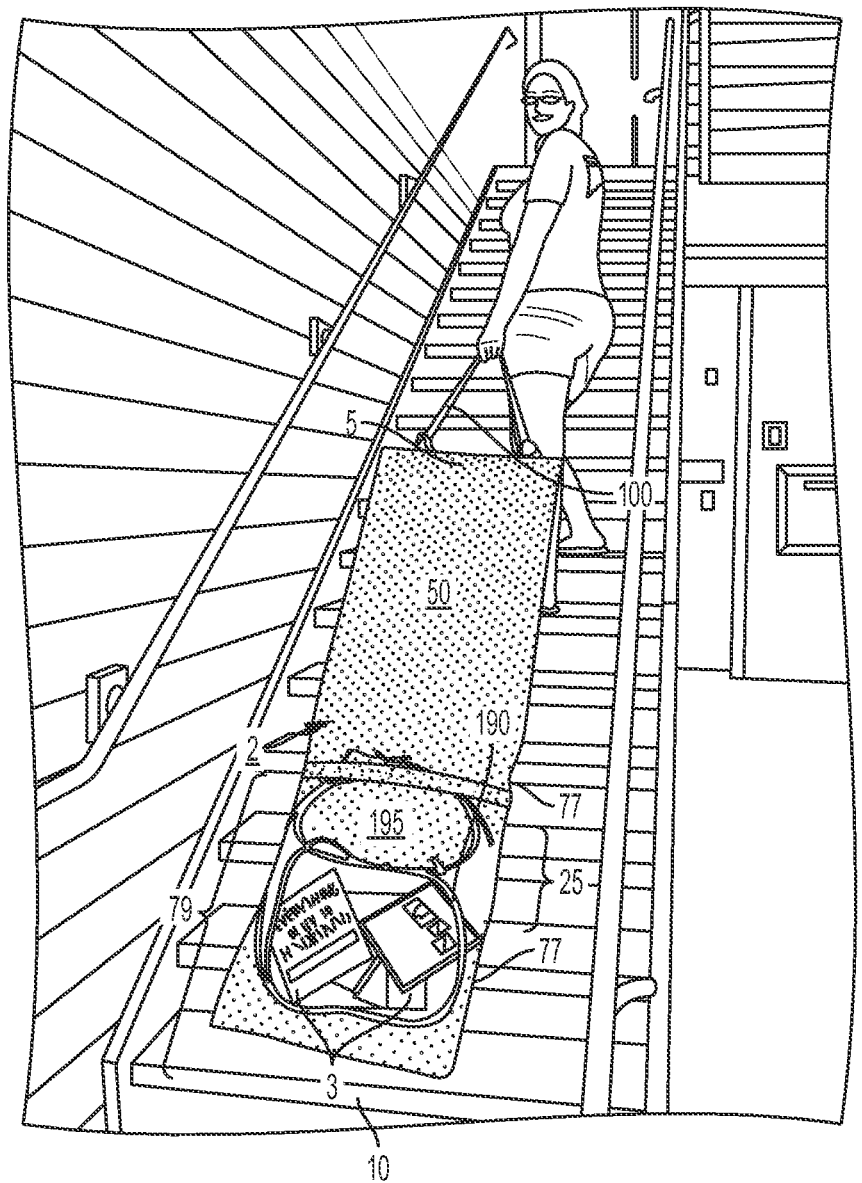
FIG. 5 is a photograph showing one embodiment of a slider according to the subject invention being utilized to drag articles up an incline, i.e., stairs.
Figure 6A:
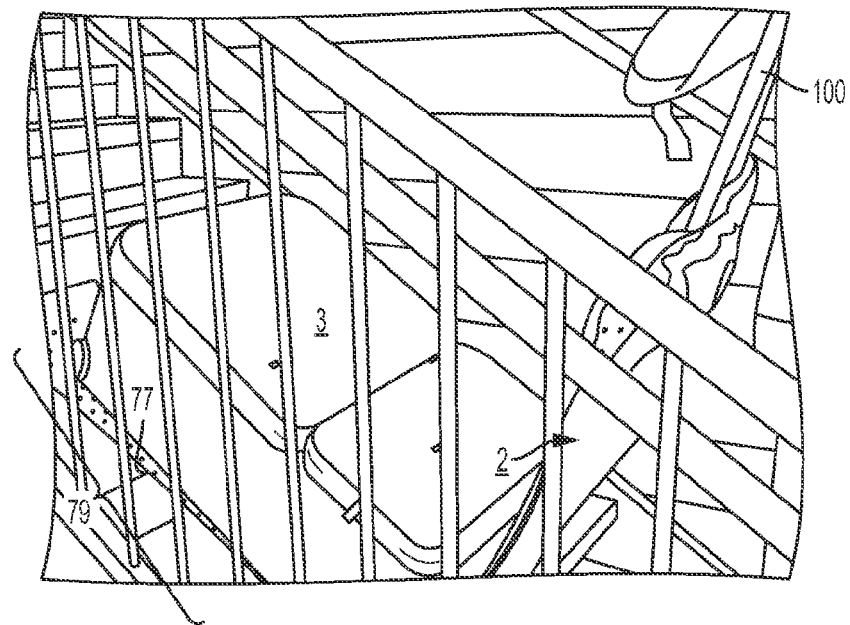
FIGS. 6A and 6B are photographs showing one embodiment of a slider according to the subject invention being utilized to drag articles down an incline, i.e., stairs.
Figure 6B:
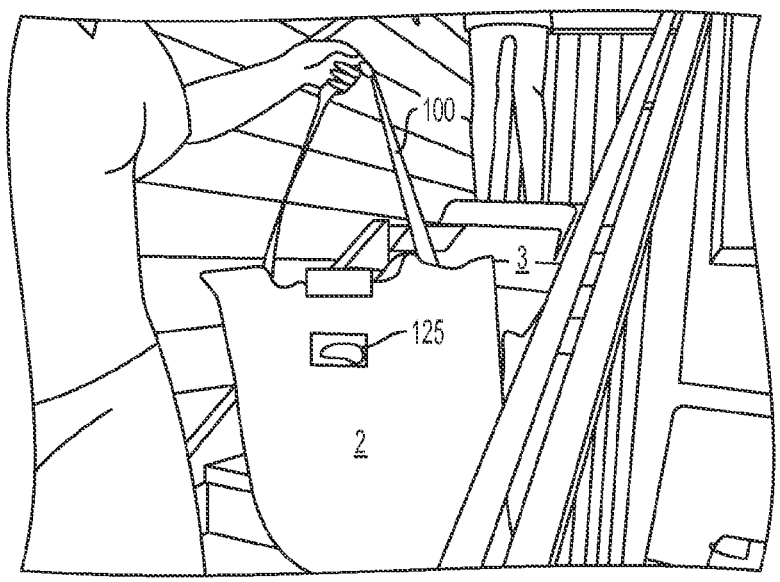

The dimensions of a cushioned body can depend upon the intended articles to be moved and the type of structure over which it may slide. It can be preferable for the cushioned body to have sufficient length, where the length is a distance from the distal end to the proximal end, that at least a portion of the proximal end can be lifted off the structure, as illustrated in FIGS. 5, 6A and 6B. As shown in FIGS. 6A and 6B, this can provide a user with more control over the cushioned body and articles thereon, when descending stairs. It can also allow that portion on which articles are not placed or stacked to be lifted off the structure to reduce friction. Further, as will be discussed below, the distal end of the cushioned body can be secured over articles placed on the cushioned body to secure it while ascending stairs.

The width of a cushioned body can also vary. The width can be dictated by factors such as the type of material(s) utilized for the cushioned body, the flexibility of the cushioned body, and the maximum weight of articles that can be placed on the cushioned body, as well as other factors understood by those with skill in the art. As shown in the example in FIGS. 5, 6A, and 8, another factor to be considered is the width of stairs, such as the stairs shown in the examples in FIGS. 6A and 6B.

In one embodiment, the length of a cushioned body is between approximately 5 ft. and approximately 10 ft. In a more specific embodiment, the length of a cushioned body is between approximately 5 ft. and 7 ft. In a still more specific embodiment, the length of a cushioned body is approximately 6 ft. The width of a cushioned body can be between approximately 1 ft. and approximately 4 ft. In a specific embodiment, the width of a cushioned body is between approximately 1 ft. and approximately 3 ft. In a more specific embodiment, the width of a cushioned body is approximately 1.8 ft. In other embodiments, the body can have a length of at least 5, 6, 7, 8, 9, 10, 11, and/or 12 ft., and/or a length in a range between any two of the values listed.

Figure 4:
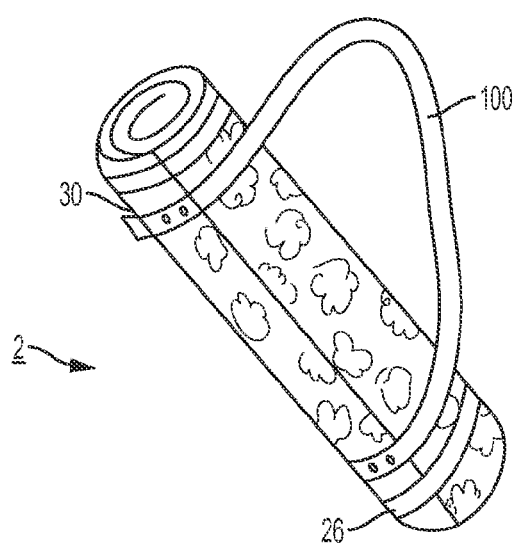
FIG. 4 is a perspective illustration of one embodiment of a slider according to the subject invention, which has been rolled up and secured.

Thus, it will be understood that a cushioned body can have any of a variety of configurations and materials. The various embodiments provide a flexible top outer surface with a top loading region 22 on which articles can be placed or stacked and which allows those articles to be moved by sliding over a structure that is substantially horizontal or inclined, such as the surfaces of stairs. Ideally a slider can be rolled up for convenient storage, such as shown in FIG. 4. Securing straps 150, such as shown in FIGS. 1 and 10, can be used to maintain the rolled up shape. However, this is not a requirement and sliders having cushioned bodies of more durable materials may not be easily rolled up, folded, or otherwise reduced to a compact form. It is within the skill of a person trained in the art to determine one or more appropriate materials and configurations for a cushioned body. Such variations, which provide the same function, in substantially the same way, with substantially the same result are within the scope of this invention.

Articles 3 to be moved with the aid of a slider 2 embodiment, according to the subject invention, can be placed on the top side 20. In a particular embodiment, articles are placed within a top loading region 22 on the top side. It can be advantageous to secure articles to the top side, particularly, but not exclusively, if the slider is to be used on inclined structure. There are a multitude of devices that can be used to secure articles to a cushioned body.

In one embodiment, at least one tie 155, having at least two ends, is operably attached, or interconnected, at least one end, to the cushioned body, to be utilized for securing articles 3. A tie can be any elongated material, such as, but not limited to, rope, strap, wire, chain, cable, combinations thereof or other similar objects, that can be placed around, through, or over an article on the cushioned body to secure it thereto. In a further embodiment, a plurality of ties is attached to or interconnected with the cushioned body, such that any one or more can be used for securing articles.

A tie can be employed by any method known in the art to secure articles. In one embodiment, one or more securing mechanisms 160 are also attached to the cushioned body and can be used to secure straps around articles. For example, various types of buckles, clamps, clips and stays could be used to secure the ends of straps to hold articles in place. Alternatively, the straps can be secured to themselves or each other by tying, looping, or with the use of hook and loop material. FIG. 2 illustrates an embodiment of a cushioned body with ties 155 and securing mechanisms 160 attached thereto. It is within the skill of a person trained in the art to determine one or more types of securing mechanisms that can be used with the various embodiments of the subject invention. Such variations are within the scope of this invention.

Figure 3:
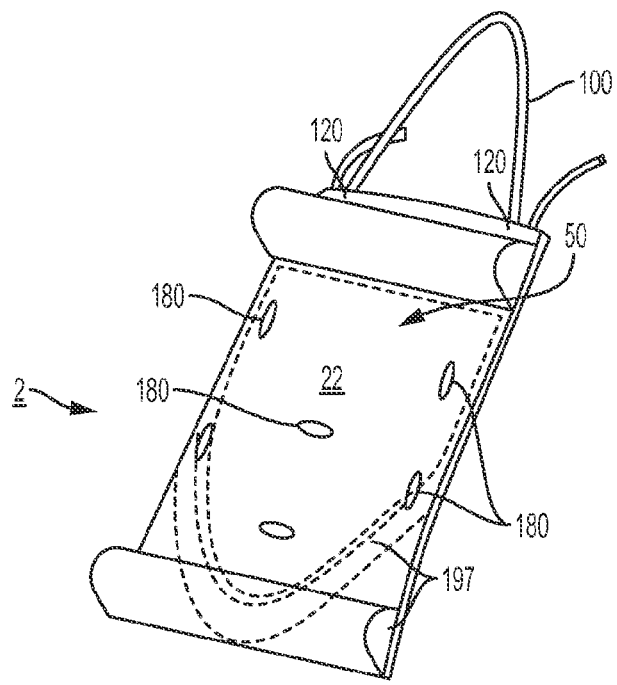
FIG. 3 is a distal end perspective illustration of one embodiment of a slider according to the subject invention.

To further secure articles on a cushioned body, there can be one or more eyelets 180 in the cushioned body through which one or more ties can pass. The eyelets can be located anywhere on a cushioned body, including, but not limited to, in the periphery of the cushioned body, as shown, for example, in FIGS. 1 and 3, or in an area away from the periphery, as also shown in FIG. 3. Once a tie 155 has been passed through an eyelet 180 it can be secured, as described above.

Figure 7:
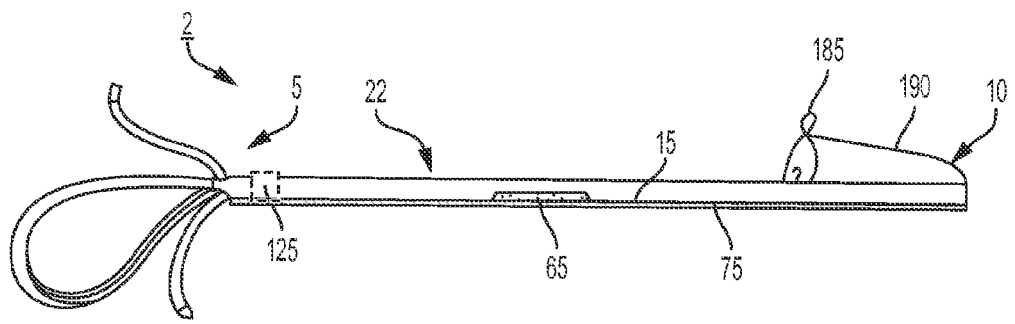
FIG. 7 is a side elevation illustration of one embodiment of a slider according to the subject invention, having a pocket formed thereon.

FIG. 5 illustrates another embodiment wherein the cushioned body has at least one pocket 190 into which articles can be placed for transport. A pocket can be a separate component secured to a cushioned body, as shown in the example in FIG. 5. Alternatively, the pocket can be formed as part of the cushioned body, which is shown in FIG. 7. The dimensions of a pocket can vary, as can the location of a pocket on a cushioned body.

Figure 9:
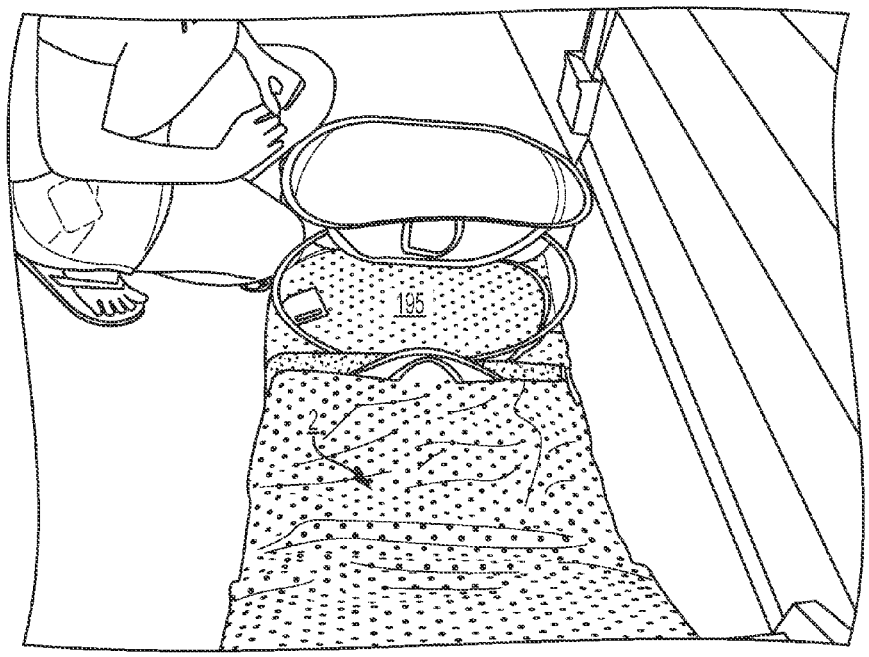
FIG. 9 is a photograph of the embodiment of a slider shown in FIG. 8, wherein the pocket has been expanded and the mouth is open for use.

In one embodiment, the pocket is approximately the same width, i.e. distance between the side edges, as a cushioned body. Alternatively, a pocket can have a width that is less than or greater than the width of a cushioned body. Further, a pocket can have a length, i.e., a distance between the distal end and the proximal end, at least equivalent to that of a cushioned body. Alternatively, a pocket can be shorter than the length of a cushioned body. A pocket can also be located anywhere on the top side of a cushioned body, including off to one side of a cushioned body, near the distal end, as shown in FIGS. 7 and 9, closer to the proximal end, or at any point inbetween.

In a further embodiment, the length of a pocket, between the distal and proximal ends is 6 inches to 2 ft. In a specific embodiment, the length of the pocket is approximately 18 inches. Other specific embodiments can have a loading area for loading items to be moved, where the loading area has more rigidity, for example in a direction along the length of the body. Specific embodiments can have a loading area and/or a pocket having a loading area length and/or a pocket length (along the length of the body, which is parallel to a direction of travel) of at least 6, 7, 8, 9, 10, 11, 12, 13, 14, 15, 16, 17, 18, 19, 20, 21, 22, 23, and/or 24 in, and/or a length in a range between any two of the listed values. It should be understood that a person with skill in the art would be able to fashion a variety of pocket configurations for a cushioned body, including pockets of different dimensions than those listed here. Such variations which provide the same function, in substantially the same way, with substantially the same result are within the scope of this invention.

The embodiments of the subject invention can be particularly advantageous for use on an incline. More specifically, they can be particularly advantageous on stairs. While it will be understood by a person skilled in the art that the steps that make up any given set of stairs can have variable rise and run dimensions, it is generally understood that stairs have a configuration where there are incremental increases in height from one step to the next, such that each step has a stair edge 25. One advantage of the embodiments of the subject invention is that the cushioned body allows articles placed thereon to form a platform or bridge between the stair edges. In other words the stair edges can be temporarily connected by the cushioned body to form a platform over which the article can be dragged. Thus, the stair edges are used to form temporary ramps with the cushioned body, so that articles can be dragged up or down the stairs on a generally smooth surface. The indentations 77 formed in the bottom surface of the cushioned body, as discussed above, can inhibit uncontrolled sliding of the "ramp" itself.

Figures 12A, 12B:
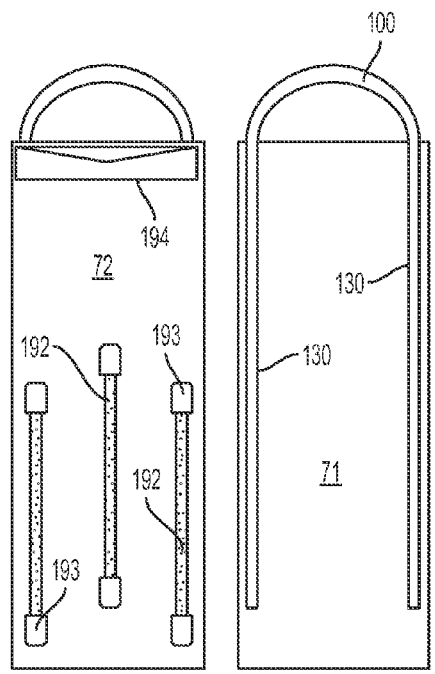
FIG. 12A is a top side view of an embodiment of a slider on which stiffening members and sleeves are utilized to make a portion of the cushioned body temporarily more rigid.
FIG. 12B is a bottom side plan view of one embodiment of a slider according to the subject invention, wherein support strands are utilized with the handle.

To assist in the ability of the cushioned body to form temporary platforms or ramps between stairs, one or more stiffening members 192 can be attached to the cushioned body. A stiffening member can be any elongated object that can be used to make some part of the cushioned body more rigid or stiff. Thus, a stiffening member can be an elongated rod, plate, dowel, or other device capable of being used to stiffen or make rigid or semi-rigid a portion of the cushioned body. The cushioned body can further include apparatuses or features that allow the stiffening members 192 to be temporarily attached to the cushioned body in a longitudinal direction, that is, in a distal to proximal direction. In one embodiment, the cushioned body, or an outer shell thereon, has one or more sleeves 193 into which an end of the stiffening body can be inserted, an example of which is shown in FIG. 12A. The sleeves can be arranged in pairs, so that opposite sides of the stiffening members can be inserted, so as to be arranged lengthwise, i.e., in a proximal end to distal end direction, as shown in FIG. 12A. Specific embodiments can have 1, 2, 3, 4, or more stiffening member that have a length (along the length of the body when in use) of at least 6, 7, 8, 9, 10, 11, 12, 13, 14, 15, 16, 17, 18, 19, 20, 21, 22, 23, and/or 24 in, and/or a length in a range between any two of the listed values.

The stiffening members can be located anywhere on a cushioned body. In one embodiment, the sleeves and stiffening members are located on the top side of a cushioned body. In a further embodiment, the sleeves and stiffening members are positioned closer to the distal end 10. When not being used, the stiffening members can be removed from the sleeves and the cushioned body utilized as described above. In a further embodiment, the cushioned body can have at least one storage slip 194 into which the stiffening members can be stored in a lateral direction, so that the cushioned body can be utilized as described above.

Figure 8:
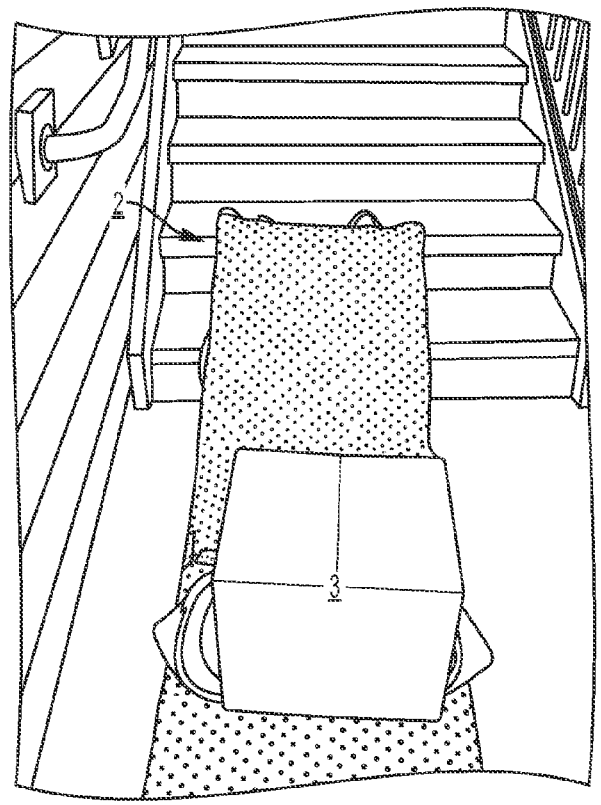
FIG. 8 is a photograph of one embodiment of a slider according to the subject invention on which an article has been placed and which has a collapsible pocket.

In a further embodiment, the mouth 195 of a pocket can have one or more closing mechanisms 185, known in the art. In a still further embodiment, a pocket can be collapsible, such that it folds, bends, collapses, or otherwise, can be made to lie generally flat against the top side 20 of the cushioned body 50. FIG. 8 illustrates an example of a pocket that can be collapsed and on which an article can be placed. FIG. 5 illustrates how that same pocket can be expanded to transport items inserted therein.

In another embodiment, a stop ridge 197 can extend above the top side and be located at or near the distal end 10 of a cushioned body, such as shown in the example in FIG. 3. A stop ridge can act like a barrier against which articles on the top side of the cushioned body can abut, to inhibit their sliding off the back of the cushioned body. A stop ridge can have any advantageous shape against which articles can abut or be adjacent to. FIG. 3 illustrates one embodiment where a stop ridge is generally a linear barrier at the distal end of the cushioned body. In an alternative embodiment, a stop ridge can be curved or angled such that articles can be at least partially surrounded by a stop ridge. This could further inhibit articles from sliding off the sides of a cushioned body. The dashed lines in FIG. 3 illustrate one example of this alternative embodiment.

A stop ridge can be a rigid material that is fixedly attached to the cushioned body. Alternatively, the stop ridge can be a semi-rigid material fixedly attached to the cushioned body. In still another alternative, the material of a cushioned body can be raised in an area to form a stop ridge on the top side of a cushioned body. There could also be more than one stop ridge on a cushioned body. For example, there could be a stop ridge at or near the proximal end as well to inhibit articles from sliding off the front of the cushioned body when used to descend stairs with an article.

The dimensions of a stop ridge 197 can vary depending upon factors understood by those with skill in the art. In one embodiment, the height of a stop ridge, which is the distance that it extends above the cushioned body, can be between approximately 1 inch to approximately 1 ft.

The ability to drag a slider 2 can be facilitated by the use of one or more handle devices 100 operatively connected to a slider. Ideally, one or more handle devices are located at or near the proximal end 5 of the slider 2. One or more handles can also be attached to or otherwise located or configured in other parts of the cushioned body. A handle can be any device or apparatus attached to the cushioned body by which a user can grasp and pull a slider 2 across or over structure, such as, for example, stairs. In one embodiment, an example of which is shown in FIGS. 5, 7 and 10, a handle is a loop of material attached by at least two ends to two different locations on the proximal end of a slider. In an alternative embodiment, a handle can be a loop of material attached at a single point at the proximal end of the slider. In another alternative, there can be more than one handle attached to a slider. In still another embodiment, the length of a handle can be adjustable.

A handle can also be in the form of one or more openings or holes within or through the slider, by which the slider can be grasped and pulled. In one embodiment, shown in FIGS. 6B and 7, there is a hole 125 through the slider at about the proximal end 5. In use, one or both hands can be used to grasp the slider with the hole 125 and drag the slider over a structure. A slider can also have more than one type of handle device. As shown in FIGS. 6B and 7, a slider could have a hole and a loop handle or one or the other. A person with skill in the art will be able to determine the appropriate number, type, and placement of handles on a cushioned body. Such variations are within the scope of this invention.

When articles of sufficient weight are placed on the slider, the point of attachment of the handles can become stressed when the slider is dragged over structure. This can cause the handle(s) to disconnect from the slider or can cause the point of attachment to weaken or rip. To prevent this, the handle attachment points 120 can be reinforced. For example, additional stitching can used to attach a handle to the cushioned body; another layer of material can be used between a handle and an attachment point; multiple types of attachments can be used, such as stitching in conjunction with adhesives or other types of reinforcements. There are numerous methods and devices known in the art by which the attachment points can be reinforced. Such variations are within the scope of this invention.

In an alternative embodiment, the handle(s) can be cooperatively attached to one or more support strands 130. A support strand can extend along all or most of the length of a cushioned body and can reduce the amount of stress on a handle attachment. A support strand can be any elongated material or object to which a handle can be attached and that can extend along some portion of the length of a cushioned body. FIG. 12B illustrates an example wherein two support strands 130 are continuous with a loop handle. The support strands can extend along the length of the bottom side 75 of a cushioned body towards the distal end 10. They can extend across the bottom side, such that they contact a structure. They could also be embedded within the cushioned body. In one embodiment, the support strands could be positioned within an outer shell 70 as discussed above. The support strands can be fixedly attached to the cushioned body so that when the handle is pulled, stresses exerted on the handle by the cushioned body and articles thereon are distributed throughout the length of the support strands. In particular, stress can be distributed to the points where the support strands attach to the cushioned body. Thus, the more attachment points between a support strand and the cushioned body, the more stress can be distributed. This can allow heavier objects to be utilized with a slider 2.

One method of using a slider is to place articles on the top surface of the cushioned body. One or more ties and/or securing mechanisms can be used to secure the article to the top surface, though this may not be required for all articles. The one or more handles can be used to pull the cushioned body, so as to drag the articles thereon. When utilized to descend stairs, the bottom side 15 with the bottom outer surface 75 can slide over the stairs, particularly the stair edges, dragging the articles on the top surface. The proximal end can be also lifted off the stairs, as seen in FIGS. 6A and 6B to assist in inhibiting the articles from sliding towards the user at the proximal end.

When utilized to ascend stairs, articles can be attached to the cushioned body, as described above, with one or more ties, securing mechanisms, or within a pocket. The handle can then be used to drag the articles up the inclined structure. FIG. 5 illustrates one example of this method of use.

Figure 11A:
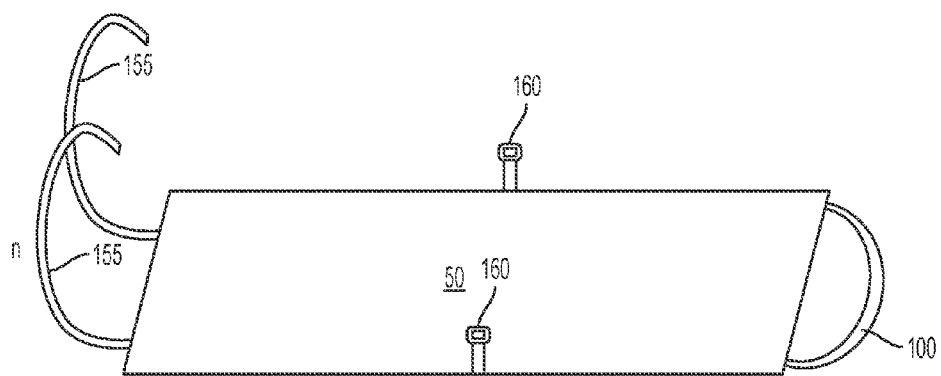
FIGS. 11A and 11B illustrate one embodiment of and a method for using a slider according to the subject invention where the cushioned body has ties at the distal end (FIG. 11A) and the distal end can be raised and secured against an object utilizing the ties (FIG. 11B).
Figure 11B:
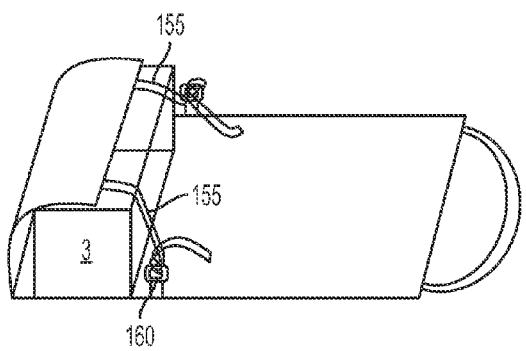

In a specific embodiment, shown in FIGS. 11A and 11B, a cushioned body 50 has at least one, ideally at least two, ties 155 attached to the distal end 10 of the cushioned body. The cushioned body has a flexible construction such that it can be folded or raised at one or more points between the distal and proximal ends 5. There can also be at least one, ideally at least two, securing mechanisms 160 located more proximally on the cushioned body. In a specific embodiment, the handle and securing mechanisms are continuous with at least one support strand 130. One or more through eyelets 180 can also be present on the cushioned body.

In a specific method of use, both the cushioned body and the at least one tie can be used to secure an article to the top surface. FIGS. 11A and 11B illustrate an embodiment where the distal end 10 of the cushioned body is folded or raised upwards, so that it fits against and conforms, at least partially, to the shape of an object placed on the cushioned body. The at least one tie can be used to attach to at least one securing mechanism located so that the tie, when attached to the securing mechanism, can hold the cushioned body against the article, as shown in the example in FIG. 11. Ties can be passed through advantageously located eyelets 180, if present, to further hold the cushioned body against the article. Once secured in such fashion, the cushioned body with the article thereon can then be dragged by the handle up inclined structure, such as stairs, without the article falling off of the cushioned body.

It should be understood that the examples and embodiments described herein are for illustrative purposes only and that various modifications or changes in light thereof will be suggested to persons skilled in the art and are to be included within the spirit and purview of this application. Thus, the scope of the invention is not limited by the specific examples and suggested procedures and uses related herein since modifications can be made within such scope from the information provided by this specification to those skilled in the art.

All patents, patent applications, provisional applications, and other publications referred to or cited herein are incorporated by reference in their entirety, including all figures and tables, to the extent they are not inconsistent with the explicit teachings of this specification.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and various modifications, both as to equipment details and operating procedures can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

I claim:

1. A device for transporting one or more articles, comprising:
a body having a proximal end, a distal end, a top side, and a bottom side, wherein the top side has a top outer surface, wherein the bottom side has a bottom outer surface,
wherein at least a portion of the top side is a top loading region, wherein at least a portion of the bottom side is a bottom contact region,
wherein the bottom outer surface of the bottom contact region is flexible, wherein at least a portion of the body proximate the bottom outer surface of the bottom contact region is resilient, and
wherein the body is configured such that when the device is positioned on a stairs having at least two stair edges, with a plurality of portions of the bottom contact region in contact with a corresponding plurality of stair edges of the at least two stair edges, and one or more articles are positioned on the top loading region such that a weight of the one or more articles is supported by the top loading region, the weight of the one or more articles causes increased pressure on at least one of the plurality of portions of the bottom contact region in contact with a corresponding at least one of the plurality of stair edges, and the bottom outer surface of the at least one of the plurality of portions of the bottom contact region at least partially conforms to a corresponding at least one shape of the corresponding at least one of the plurality of stair edges.

2. A device, according to claim 1, wherein the body comprises a body interior positioned between the top outer surface and the bottom outer surface, and
wherein the body interior, the top outer surface, and the bottom outer surface comprise a first material.

3. A device, according to claim 1, wherein the body comprises a body interior positioned between the top outer surface and the bottom outer surface, wherein at least one of the body interior, top outer surface, and the bottom outer surface comprises a first material, wherein at least one other of the body interior, top outer surface, and the bottom outer surface comprises a second material, and wherein the second material is different than the first material.

4. A device, according to claim 1, wherein the body comprises a foam material.

5. A device, according to claim 4, wherein the body comprises an outer shell inside of which the body is disposed, and wherein the bottom outer surface is a bottom outer surface of the outer shell.

6. A device, according to claim 5, wherein the bottom outer surface of the outer shell comprises two or more materials.

7. A device, according to claim 1, wherein the bottom outer surface of the bottom contact region comprises a first material, wherein the bottom outer surface of at least a portion of the bottom side that is not the bottom contact region comprises a second material, and wherein the second material is different than the first material.

8. A device, according to claim 1, further comprising: at least one handle device.

9. A device, according to claim 8, wherein the handle device is a loop of material attached to the proximal end or attached proximate the proximal end of the body.

10. A device, according to claim 9, wherein the handle device comprises a hole through the body at or proximate the proximal end of the body.

11. A device, according to claim 8, further comprising: at least one tie operably connected to the body, wherein the at least one tie is configured to secure at least one of the one or more articles to the body.

12. A device, according to claim 11, further comprising:
at least one securing mechanism operably connected to the body to which the at least one tie can be attached to secure the article to the body.

13. A device, according to claim 12, further comprising:
at least one eyelet in the body.

14. A device, according to claim 8, further comprising:
at least one support strand operably connected to and extending at least partially along a length of the body, wherein the length of the body is from the proximal end to the distal end.

15. A device, according to claim 14, wherein the support strand is further operably connected to the handle device.

16. A device, according to claim 1, further comprising:
at least one pocket on the top side of the body.

17. A device, according to claim 1, further comprising:
at least one stiffening member operably connected to the body.

18. A device, according to claim 17, further comprising:
at least one sleeve attached to the body,
wherein the at least one sleeve is configured to receive the at least one stiffening member.

19. The device according to claim 1, wherein the bottom outer surface of the bottom contact region is an uninterrupted surface.

20. The device according to claim 1, wherein the bottom outer surface of the at least one of the plurality of portions of the bottom contact region at least partially conforming to the corresponding at least one shape of the corresponding at least one of the plurality of stair edges creates a corresponding at least one indentation in the bottom contact region, and
wherein when the device is moved over the at least one of the plurality of stair edges, the at least one indentation increases friction between the at least one of the plurality of stair edges and the at least one of the plurality of portions of the bottom contact region that resists such movement.

21. The device according to claim 20, wherein the increased friction provides more control over a speed of descent of the device down the stairs or reduces a risk of the device sliding down the stairs during an ascent of the stairs.

22. A method for transporting one or more articles, comprising:
providing a device, wherein the device comprises:
a body having a proximal end, a distal end, a top side, and a bottom side, wherein the top side has a top outer surface, wherein the bottom side has a bottom outer surface,
wherein at least a portion of the top side is a top loading region, wherein at least a portion of the bottom side is a bottom contact region,
wherein the bottom outer surface of the bottom contact region is flexible, wherein at least a portion of the body proximate the bottom outer surface of the bottom contact region is resilient, and
wherein the body is configured such that when the device is positioned on a stairs having at least two stair edges, with a plurality of portions of the bottom contact region in contact with a corresponding plurality of stair edges of the at least two stair edges, and one or more articles are positioned on the top loading region such that a weight of the one or more articles is supported by the top loading region, the weight of the one or more articles causes increased pressure on at least one of the plurality of portions of the bottom contact region in contact with a corresponding at least one of the plurality of stair edges, and the bottom outer surface of the at least one of the plurality of portions of the bottom contact region at least partially conforms to a corresponding at least one shape of the corresponding at least one of the plurality of stair edges;
positioning the device on the stairs having at least two stair edges with a plurality of portions of the bottom contact region in contact with a corresponding plurality of stair edges of the at least two stair edges;
positioning one or more articles on the top loading region of the device such that the weight of the one or more articles is supported by the top loading region, so that the weight of the one or more articles causes increased pressure on at least one of the plurality of portions of the bottom contact region in contact with a corresponding at least one of the plurality of stair edges, and the bottom outer surface of the at least one of the plurality of portions of the bottom contact region at least partially conforms to a corresponding at least one shape of the corresponding at least one of the plurality of stair edges; and
pulling the device so as to slidably move the device and the one or more articles positioned on the top loading region with respect to the at least one of the plurality of stair edges such that the one or more articles are transported.

23. The method according to claim 22,
wherein the device further comprises:
a handle device by which the device can be pulled to slidably move the device and the one or more articles.

24. The method according to claim 22,
wherein the device further comprises:
at least one tie operably connected to the body,
wherein the at least one tie is configured to secure at least one of the one or more articles to the body, further comprising:
securing the at least one of the one or more articles to the body via the at least one tie.

25. The method according to claim 24,
wherein the device further comprises:
at least one securing mechanism operably connected to the body to which the at least one tie can be attached to secure at least one of the one or more articles to the body, further comprising:
attaching the at least one tie to the at least one securing mechanism to secure the at least one of the one or more articles.

26. The method, according to claim 25, wherein the body further comprises:
one or more eyelets to which at least one of the at least one tie and at least one securing mechanism can be operably connected, further comprising:
operably connecting at least one of the at least one tie and at least one securing mechanism to the one or more eyelets.

27. The method, according to claim 26, further comprising:
securing the one or more articles to the device utilizing the eyelets with the ties.

28. The method, according to claim 25, further comprising:
raising the distal end of the body so that the top side abuts at least one of the one or more articles positioned on the top loading region; and
securing at least one of the one or more ties to at least one of the one or more securing mechanisms so that the top side of the raised portion of the body is secured against at least one of the one or more articles.

29. The method, according to claim 28, further comprising: utilizing at least one eyelet with the at least one tie and the at least one securing mechanism to secure the top side of the raised portion of the body against the one or more articles.

30. The method, according to claim 22, further comprising: raising at least a portion of the proximal end of the body, so that at least one of the one or more articles on the top side abuts a raised portion of the body, such that the raised portion of the body supports the at least one of the one or more articles and prevents the one or more articles from sliding towards the proximal end of the body.

31. The method, according to claim 30, further comprising: adjusting the portion of the body that is raised, as the device is pulled, so that the one or more articles abut against more or less of the raised portion of the body as the device is pulled.

32. The method, according to claim 22, wherein the bottom outer surface of the bottom contact region is an uninterrupted surface.

33. The method according to claim 22, wherein the bottom outer surface of the at least one of the plurality of portions of the bottom contact region at least partially conforming to the corresponding at least one shape of the corresponding at least one of the plurality of stair edges creates a corresponding at least one indentation in the bottom contact region, and wherein when the device is moved over the at least one of the plurality of stair edges, the at least one indentation increases friction between the at least one of the plurality of stair edges and the at least one of the plurality of portions of the bottom contact region that resists such movement.

34. The method according to claim 33, wherein the increased friction provides more control over a speed of descent of the device down the stairs or reduces a risk of the device sliding down the stairs during an ascent of the stairs.

* * * * *